July 18, 1967
J. T. BROWN ETAL
3,331,993
ELECTROLYTIC CAPACITOR WITH HIGHLY PURE
TITANIUM ELECTRODE AND
METHOD FOR MAKING
Filed Oct. 21, 1964
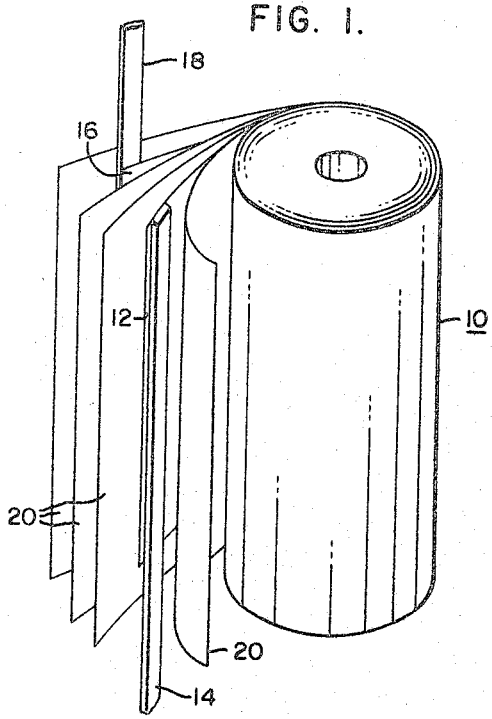
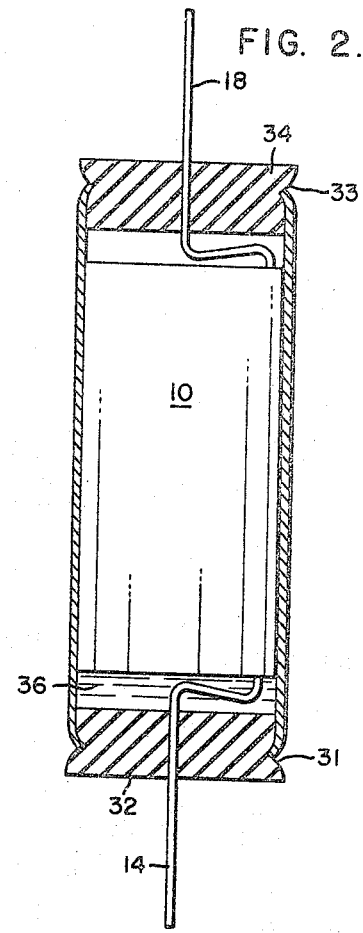
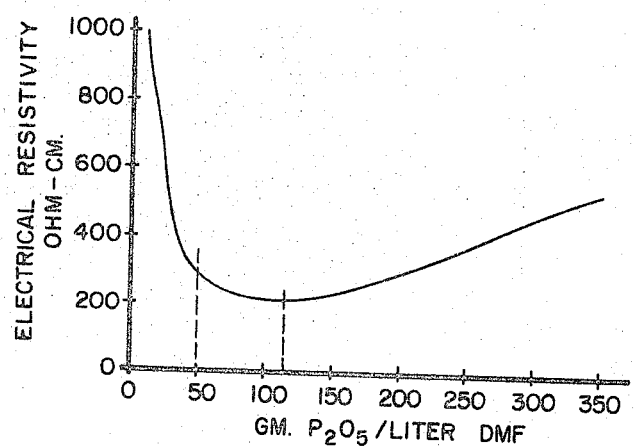
WITNESSES:
John L. Chopp
James F. Young
INVENTORS
Jack T. Brown, William Feduska
and Robert E. Gainer, Jr.
BY
Frederick Shopor
ATTORNEY

United States Patent Office 3,331,993
Patented July 18, 1967

3,331,993
ELECTROLYTIC CAPACITOR WITH HIGHLY PURE TITANIUM ELECTRODE AND METHOD FOR MAKING
Jack T. Brown, Monroeville, William Feduska, Emsworth, and Robert E. Gainer, Jr., Monroeville, Pa., assignors to Westinghouse Electric Corporation, East Pittsburgh, Pa., a corporation of Pennsylvania
Filed Oct. 21, 1964, Ser. No. 405,343
9 Claims. (Cl. 317—230)

ABSTRACT OF THE DISCLOSURE

A cold rolled and annealed titanium capacitor foil of high purity is anodized in an essentially non-aqueous electrolyte containing a solute including a phosphorous compound comprising at least 80% $P_2O_5$ by weight to produce a surface layer of a dielectric oxide.

---

This invention relates to electrolytic capacitors, and in particular to capacitors embodying titanium electrodes.

While it has been proposed to employ electrodes of titanium metal in electrolytic capacitors, and numerous patents have issued on titanium capacitors, as a practical matter electrolytic capacitors embodying titanium metal have not been commercially satisfactory heretofore. In use they have failed unexpectedly and prematurely, often at very low voltages. Other shortcomings in titanium metal capacitors have been encountered in applying them.

The object of the present invention is to provide a process for producing a commercially satisfactory capacitor of titanium metal.

Another object of the present invention is to provide a process for producing foils of titanium metal having a chemical composition enabling satisfactory capacitors to be made therefrom.

A further object of the invention is to provide for anodizing titanium metal in a forming electrolyte containing phosphorus.

A still further object of the invention is to provide for anodizing titanium metal in an essentially anhydrous forming electrolyte containing a high proportion of a phosphorus compound.

Another object of the invention is to provide an electrolytic capacitor comprising an electrode of titanium metal having an anodic dielectric oxide film produced thereon by an essentially anhydrous forming electrolyte comprising at least 80% $P_2O_5$ by weight.

A still further object of the invention is to provide an electrolytic capacitor comprising an electrode of titanium metal having an anodic dielectric oxide film produced thereon by an essentially anhydrous forming electrolyte comprising a high proportion of $P_2O_5$, and a non-aqueous working electrolyte in the capacitor comprising a phosphorus compound.

Another object of the invention is to provide a process for producing an electrolytic capacitor by anodizing highly purified titanium metal on a non-aqueous electrolyte, and employing a non-aqueous electrolyte for the working electrolyte.

A still further object of the invention is to provide highly purified titanium metal for capacitors by electrically melting titanium at least three times, at least the last melting comprising electron beam melting in a high vacuum and rolling the resulting titanium into a foil or other shape.

Other objects of the invention will in part be obvious and will in part appear hereinafter. For a better understanding of the nature and objects of the invention reference should be had to the following detailed description and drawing, in which:

FIGURE 1 is a view in perspective of a capacitor in the process of assembly.

FIG. 2 is a vertical cross section through a complete electrolytic capacitor.

FIG. 3 is a curve plotting electrical resistivity against concentration of an electrolyte.

In accordance with this invention, it has been discovered that highly satisfactory capacitors capable of commercial use can be prepared from titanium metal providing that (1) highly purified titanium metal in foil, wire, sheet, pellets or other shapes is (2) anodized in an essentially anhydrous forming electrolyte containing a phosphorus compound, preferably $P_2O_5$, and (3) the anodized titanium metal assembled with another electrode into a capacitor is employed with a working electrolyte, preferably the working electrolyte is essentially anhydrous and contains $P_2O_5$.

In order to produce electrolytic capacitors, for instance foil capacitors, in accordance with the invention, from purified titanium metal, the following main steps are employed:

(1) Prepare an ingot of purified titanium metal having less than 300 p.p.m. of iron, less than 130 p.p.m. of carbon and less than 750 p.p.m. of oxygen and only minute quantities of other elements, where "minute quantities" means that such other elements as are present will each not ordinarily exceed an amount of up to 750 p.p.m., (2) Cold roll the purified titanium metal into foil of, for example, a thickness of 0.0005 inch, (3) Anneal the foil at a temperature above 750° C. in a non-reactive atmosphere such as vacuum or an inert gas, (4) Anodize the annealed titanium foil in an essentially non-aqueous electrolyte containing as an essential component a phosphorus compound to produce an adherent dielectric oxide layer on the surfaces treated, (5) Assemble the anodized titanium foil with another electrode, ordinarily a similar titanium foil that also has been anodized, with an insulating separator sheet or film therebetween, and (6) Apply to the assembly of anodized foil and the other electrode a working electrolyte; preferably the working electrolyte is an essentially non-aqueous electrolyte comprising a non-aqueous solvent and a phosphorous compound dissolved in it in an amount to provide at least 10 grams per liter of $P_2O_5$.

More particularly, the titanium metal has less than 300 p.p.m. of iron, less than 130 p.p.m. of carbon and less than 750 p.p.m. of oxygen, and only minute quantities of other elemental impurities The preferred procedure to obtain titanium of this purity from commercially pure titanium which has a typical analysis of from 133 to 1040 p.p.m. carbon, 425 to 2430 p.p.m. oxygen, about 100 p.p.m. nitrogen, 146 p.p.m. or more of hydrogen, 215 to 500 p.p.m. iron and from 15 to 100 p.p.m. of other metallics, is to subject the titanium metal to at least three electrical meltings of which at least the last is electron beam melting under a high vacuum of one micron absolute pressure or less. The other first electrical meltings are arc melting, preferably consumable arc melting, in a low pressure inert gas such as argon or helium at least for the first melting, or under a vacuum. Titanium sponge of high purity is obtainable and may be compacted into an electrode bar which is then double consumable arc melted, the first time in argon gas at less than atmospheric pressure, followed by a vacuum remelt under vacuum, see Patent 3,072,982 for suitable conditions and techniques. One, two or three final electron beam meltings under a high vacuum may be applied to the double consumable arc melted titanium ingot which will result in an unusually soft and extremely pure titanium ingot.

As a result of the purification processing of the titanium metal the titanium ingot can be cold rolled into foil, wire or sheet with relative ease. Titanium ingots of up to 2000 pounds have been produced and are as readily cold rolled to foil of a thickness of 0.0005 inch as were 15 pound laboratory sized ingots of titanium made by the same procedure. Hereafter specific reference will be made to titanium foil, but it will be understood that wire, sheet or other shapes may be similarly processed.

The following Table I indicates the composition of commercially available titanium foil and foil produced by (a) double consumable arc melting, and (b) double consumable arc melting followed by from one to three vacuum electron beam (E.B.) remelts; the impurities present being in parts per million (p.p.m.).

sults in Table II were obtained at 30 volts after the indicated hours at the indicated test conditions:

TABLE II

| Material | Test Conditions | Cap., μf | Leakage μa |
|---|---|---|---|
| Commercial Ti Foil | Room Temp., 48 hrs | 1.30 | 0.69 |
| Do | 85° C., 100 hrs | 1.38 | 20 |
| Do | 85° C., 500 hrs | 1.94 | 320 |
| 1844—Double Arc | Room Temp., 48 hrs | 1.15 | 0.40 |
| Do | 85° C., 100 hrs | 1.21 | 11.5 |
| Do | 85° C., 500 hrs | 1.36 | 70.0 |
| 5339—Db. Arc+1 E.B | Room Temp., 48 hrs | 1.22 | 0.21 |
| Do | 85° C., 100 hrs | 1.31 | 10.8 |
| Do | 85° C., 500 hrs | 1.41 | 35 |
| 7339—Db. Arc+3 E.B | Room Temp., 48 hrs | 1.16 | 0.25 |
| Do | 85° C., 100 hrs | 1.25 | 4.8 |
| Do | 85° C., 500 hrs | 1.34 | 31 |

It should be noted that the leakage current is far less for the 5339 and 7339 titanium foils, dropping by a factor of 10 at 500 hours at 85° C. as compared to commercial titanium foil. This difference is extremely significant particularly since the optimum anodizing working electrolyte and other conditions were not employed in these tests, far better results being obtained when all the treatments are optimized as will be disclosed hereinafter.

In view of the high degree of cold working, the foil or wire is desirably annealed before further processing. For a low voltage capacitor, that is below about 25 volts,

TABLE I.—TITANIUM ANALYSES

| Titanium Material | C | O | N | H | Fe | Other Metallics |
|---|---|---|---|---|---|---|
| Commercial Foil | 1,040 | 2,430 | 97 | 146 | 500 | 15 |
| 3844—Double Arc Melting | 100 | 790 | 50 | 73 | 265 | 15 |
| 3739—Double Arc Melt+One E.B | 100 | 610 | 54 | Nil | 190 | 15 |
| 1639—Double Arc Melt+Two E.B | 110 | 500 | 67 | Nil | 150 | 15 |
| 3539—Double Arc Melt+Three E.B | 70 | 580 | 55 | Nil | 200 | 15 |

When tested at room temperature (25° C.) for 4000 hours at 30 volts, capacitors made of foils of the 5339 alloy and commercial foil, anodized in an anhydrous electrolyte containing phosphorus in identical manner and both treated with the same working electrolyte, gave the following leakage and capacitance values:

| | Capacitance, μF | Leakage Current, μa |
|---|---|---|
| Commercial foil | 1.26 | 1.4 |
| 5339 foil—Double arc melt+1 E.B | 1.17 | 0.05 |

The critical leakage current value is 28 times greater for the commercial foil than for the purified titanium foil.

A plurality of similar capacitors were prepared by anodizing identically and operating in an identical working electrolyte some of the foils of Table I, and the rethe annealing is not needed, but for use at higher voltages, particularly at 40 volts and higher, better results are obtained if the titanium foil is annealed. Stress relief and recrystallization occur on annealing and temperature and time are employed to secure these results. The annealing is carried out at temperatures above 750° C., and preferably in the range of about 850° C. to 925° C., or higher, in a vacuum of, for example, $10^{-5}$ torr.

A series of similar capacitors was prepared from 5339 foil (double arc melted and one electron beam melted ingot) wherein unannealed and foils annealed at 550° C., 850° C. and 925° C. for one-half hour under vacuum of less than $10^{-5}$ torr were employed. All the foils were anodized identically and formed into capacitors with the same working electrolyte. The tests were all conducted at 50 volts, a much more severe test than in Table II, and the results obtained are shown in Table III.

TABLE III

| Annealing Temp. (° C.) | Test Conditions | Cap. (μf) | D.F. (percent) | Leak. Cur. (μa) |
|---|---|---|---|---|
| Unannealed | 50 V., R.T., initial | 4.9 | 5.2 | 2.4 |
| Unannealed | 50 V., 85° C., 100 hrs | 5.2 | 2.6 | 30 |
| Unannealed | 50 V., 85° C., 900 hrs | 4.9 | 3.5 | 26 |
| 550 | 50 V., R.T., initial | 4.1 | 5.1 | 0.41 |
| 550 | 50 V., 85° C., 100 hrs | 4.3 | 1.9 | 5.2 |
| 550 | 50 V., 85° C., 900 hrs | 4.1 | 2.1 | 8.8 |
| 850 | 50 V., R.T., initial | 5.6 | 6.2 | 0.54 |
| 850 | 50 V., 85° C., 100 hrs | 5.9 | 2.0 | 5.2 |
| 850 | 50 V., 85° C., 900 hrs | 5.9 | 2.0 | 5.0 |
| 925 | 50 V., R.T., initial | 5.7 | 6.4 | 0.32 |
| 925 | 50 V., 85° C., 100 hrs | 6.0 | 2.5 | 3.4 |
| 925 | 50 V., 85° C., 900 hrs | 6.0 | 2.5 | 4.8 |

It will be observed that a five fold or better reduction in leakage factor is obtained on annealing the titanium at 850° C. and 925° C. Surprisingly, the capacitance increases by a very substantial amount as well upon annealing the foils before anodizing them.

Prior to annealing, if annealed, the titanium foil is cleaned before being anodized. Cleaning in a vapor-phase degreaser employing trichloroethylene, and/or in concentrated phosphoric acid, should remove any rolling lubricants or other surface contaminants.

Further, the surface of the titanium foil can be etched to increase the exposed surface area whereby to secure increased capacitance per unit area of foil. A specific etching procedure is covered in a patent application of C. C. Hardman.

The cleaned foil is subjected to the critical anodizing treatment wherein the forming electrolyte is essentially anhydrous and contains as an essential component phosphorus or phosphorus containing ions. Polyphosphoric acid or pyrophosphoric acid having over 80% $P_2O_5$ (by weight) is a critical component for the forming electrolyte. Commercial concentrated orthophosphoric acid—85% $H_3PO_4$ or 61.5% $P_2O_5$—is completely unsatisfactory for anodizing titanium since it fails to produce thereon capacitor grade dielectric oxide films. Phospholeum, called 105% phosphoric acid, has 76% $P_2O_5$, but is not satisfactory either. When the phosphoric acid ($H_3PO_4$) is subjected to heating and dehydration there result higher phosphoric acids wich are anhydrous in nature and comprise over 80% $P_2O_5$, and it is with these that it has been found titanium can be successfully anodized. Excellent results have been had with a polyphosphoric acid having an 84.5% $P_2O_5$ content. Inasmuch as the viscosity increases rapidly, polyphosphoric acid of about 85% $P_2O_5$ content is at the upper limit for commercial handling, though with special care they can be employed.

The polyphosphoric acid can be used as the anodizing electrolyte alone, or dissolved in dimethylformamide (DMF) which is a non-aqueous organic solvent.

Titanium can be anodized at progressively higher maximum voltages as the proportion of dimethylformamide in the forming electrolyte increases. The maximum anodic voltage is determined by the electrical breakdown of the coating by a scintillation phenomenon. The following Table IV shows the maximum forming voltage for a series of compositions comprising 84.5% $P_2O_5$ polyphosphoric acid and DMF in various volume proportions.

| Percent DMF (volume): | Maximum forming voltage |
|---|---|
| 0 | 55 |
| 25 | 75 |
| 33 | 80 |
| 67 | 100 |
| 75 | 135 |
| 90 | 200 |
| 95 | 200 |

However, the films produced in electrolytes exceeding approximately 33% of DMF have rapidly increasing leakage values, and accordingly the best anodic oxides are made on polyphosphoric acid with not over 33% DMF by volume.

The anodizing conditions for best overall results are direct current at not over about 70 volts maximum applying a relatively constant current of about one milliampere per square centimeter of titanium surface being anodized. The forming electrolyte temperature is preferably from 90° C. to 100° C. After the anodizing cell reaches a constant voltage, anodizing is preferably continued for 1 to 1.5 hours.

After anodizing, the titanium foil is ready to be assembled into a capacitor. Various capacitor assemblies are feasible and are known. Referring to FIGURE 1, there is illustrated a roll capacitor prepared by winding a foil 12 of the anodized titanium metal, which foil has an electrical lead 14 welded, crimped or otherwise affixed to one end thereof. A second anodized foil 16 which may be of titanium, though ordinarily anodized at a lower voltage, with an electrical lead 18 affixed to one end thereof, but extending upwardly where lead 14 extends downwardly, is disposed in contiguous relationship to foil 12, with one or more interposed sheets 20 of paper, glass cloth, synthetic resin or other insulating separator therebetween.

After forming a tight roll, the capacitor assembly 10 of FIGURE 1 is inserted into a cylindrical casing 30 as shown in FIGURE 2. Insulating end plugs 32 and 34 of polytetrafluoroethylene or other resin with peripheral grooves 31 and 33, respectively are disposed at the ends of the cylindrical casing 30 and the ends of the casing crimped into the grooves to provide a seal. The casing 30 may be of metal, glass, or resin. The electrical leads 14 and 18 pass through closely fitting apertures in the plugs 32 and 34 to the exterior of the casing. The interior of the casing is filled with a working electrolyte 36 usually with an air space at the ends to provide for expansion of the liquid as the capacitor heats up in service. In some cases all excess electrolyte is drained from the capacitor leaving only what is held in place by capillary action.

The working electrolyte 36 for use in the present invention must be an essentially anhydrous fluid at both the maximum operating temperatures of the capacitor and at the lowest temperatures to which it will be reasonably exposed—usually −55° C. The electrolyte must not increase excessively in resistance over the range of temperatures of its use. It has been discovered that highly useful working electrolytes comprise phosphorus in an amount to provide at least 10 grams per liter of $P_2O_5$. The electrolytes preferably include a non-aqueous solvent such as dimethylformamide (DMF). Polyphosphoric acid in DMF is a good working electrolyte. Solutions of $P_2O_5$ in DMF have given excellent results. In FIGURE 3 of the drawing is plotted the electrical resistivity at room temperature of solutions of $P_2O_5$ and DMF. It will be seen that at a concentration of 113 grams per liter of $P_2O_5$ occurs the minimum resistivity of 210 ohm-centimeters.

While electrolytes having from 10 to 340 grams of $P_2O_5$ per liter are usable, preferred ranges are 25 to 200 grams of $P_2O_5$ per liter. For low voltage units the lowest resistivity electrolytes are preferable, while for 30 volt to 50 volt capacitors the solutions having concentrations of about 50 grams of $P_2O_5$ per liter give better overall results.

Other working electrolytes may be employed, though the $P_2O_5$-DMF solutions gave excellent results. Many anhydrous liquids such as glycols may be added thereto.

A series of capacitors were prepared following the optimum teaching above using the 5339 titanium foil. The foils were anodized at 70 volts using the 25% DMF-75% polyphosphoric acid (84.5% $P_2O_5$) forming electrolyte and with a working electrolyte containing 113 grams liter of $P_2O_5$ in DMF solution for 6 and 15 volt tests, and a 50 grams per liter of $P_2O_5$ in DMF solution for 50 volt tests.

Tests were conducted on the capacitors in a variety of ways as indicated in Tables V to IX, with the results set forth therein.

TABLE V.—6-VOLT CONTINUOUS SERVICE AT +85° C.

| Time (hrs.) | Cap. (µf) | D.F. (percent) | Leakage Current (µa) |
|---|---|---|---|
| 100 | 44.5 | 15.0 | 4.0 |
| 500 | 44.4 | 15.6 | 1.68 |
| 1,000 | 44.0 | 15.0 | 1.32 |
| 2,000 | 45.0 | 14.0 | 0.94 |
| 3,000 | 47.0 | 13.6 | 0.60 |
| 4,000 | 47.6 | 14.0 | 0.67 |
| 4,900 | 47.9 | 14.2 | 0.75 |

TABLE VI.—6-VOLT MILITARY SPECIFICATION UNIT C-2, TEMPERATURE CYCLING

| Temperature (° C.) | Cap. (µf) | D.F. (percent) | Leakage Current (µa) |
|---|---|---|---|
| +25, Initial | 29.8 | 10.4 | 0.18 |
| +85 | 31.8 | 9.0 | 1.62 |
| +25 | 31.0 | 11.2 | 0.02 |
| −55 | 23.1 | 89 | Nil |
| +25 | 30.9 | 11.2 | 0.02 |

TABLE VII.—15-VOLT MILITARY SPECIFICATION C-2

| | Cap. (µf) | D.F. (percent) | Leakage Current (µa) |
|---|---|---|---|
| +25° C. initial | 19.3 | 12.6 | 0.39 |
| +85° C. 2,000 hrs | 18.8 | 7.1 | 3.2 |

TABLE VIII.—50-VOLT CONTINUOUS SERVICE AT +85°C.

| Time (hrs.) | Cap. (µf) | D.F. (percent) | Leakage Current (µa) |
|---|---|---|---|
| 100 | 3.58 | 2.0 | 20 |
| 500 | 3.90 | 3.0 | 16 |
| 1,000 | 3.88 | 3.2 | 13.7 |
| 2,000 | 3.64 | 3.5 | 11.2 |
| 3,000 | 3.56 | 3.6 | 13 |

TABLE IX.—50-VOLT MILITARY SPECIFICATION UNIT C-2, TEMPERATURE CYCLING

| Temperature (° C.) | Cap. (µf) | D.F. (percent) | Leakage Current (µa) |
|---|---|---|---|
| +25, Initial | 5.67 | 6.4 | 0.32 |
| +85 | 5.98 | 2.5 | 3.1 |
| +25 | 5.77 | 4.2 | 0.20 |
| −55 | 5.05 | 22.0 | Nil |
| +25 | 5.73 | 4.2 | 0.18 |
| +85 | 6.00 | 2.6 | 3.5 |

These tables show that excellent results are obtained. In particular, the leakage current drops substantially on prolonged testing at any given temperature. Note in Table V that while the leakage current after 100 hours is 4 µa., it steadily decreases to 0.67 at 4000 hours.

Numerous other capacitors were made and tested and showed excellent properties over a wide range of service conditions. Capacitors can be prepared from wire or sheets of purified titanium assembled in various forms, as by stacking, or placing a flat sheet on another after anodizing them.

It is understood that the above description and drawing are exemplary only and not limiting.

We claim as our invention:

1. In the process of producing an electrolytic capacitor embodying an electrode of titanium, the steps comprising:
    (1) preparing an ingot of purified titanium by electrically melting at least three times titanium metal to produce the ingot, the titanium metal after the last melting having less than 300 p.p.m. of iron, less than 130 p.p.m. of carbon and less than 750 p.p.m. of oxygen, and minute quantities of other elements,
    (2) rolling the purified titanium ingot into foil,
    (3) annealing the titanium foil at a temperature above 750° C. to recrystallize and stress relieve the foil,
    (4) anodizing the titanium foil in a non-aqueous electrolyte containing a solute including a phosphorus compound comprising at least 80% by weight of $P_2O_5$ to produce a surface layer of a dielectric oxide,
    (5) assembling the anodized titanium foil with another electrode, and
    (6) applying to the assembly of foil and said another electrode a working electrolyte.

2. In the process of producing an electrolytic capacitor embodying an electrode of titanium, the steps comprising:
    (1) anodizing in a non-aqueous electrolyte containing a solute including a phosphorus compound comprising at least 50% by weight of $P_2O_5$ a titanium electrode having an extended surface composed of highly purified titanium having less than 300 p.p.m. of iron, less than 130 p.p.m. of carbon and less than 750 p.p.m. of oxygen, the balance being titanium except for minute quantities of other elements, the anodizing producing a layer of dielectric oxide on the anodized surfaces of the titanium electrode,
    (2) assembling the anodized titanium electrode with another electrode, and
    (3) applying to the assembly of anodized titanium electrode and said another electrode a working electrolyte.

3. In the process of producing an electrolytic capacitor embodying an electrode of titanium, the steps comprising:
    (1) anodizing in a non-aqueous electrolyte containing a solute including a phosphorus compound comprising at least 80% of weight of $P_2O_5$ a foil of highly purified titanium having less than 300 p.p.m. of iron, less than 130 p.p.m. of carbon, less than 750 p.p.m. of oxygen, and the balance being titanium except for minute quantities of other elements, the anodizing producing a dense layer of dielectric oxide on the anodized surfaces of the titanium foil,
    (2) assembling the anodized foil with another electrode, and
    (3) applying to the assembly of anodized foil and the said another electrode a non-aqueous working electrolyte including a phosphorus compound in proportions of at least 10 grams of $P_2O_5$ per liter of electrolyte.

4. In the process of producing an electrolytic capacitor embodying a foil of titanium, the steps comprising:
    (1) annealing at a temperature of at least 750° C. a foil of highly purified titanium having less than 300 p.p.m. of iron, less than 130 p.p.m. of carbon, less than 750 p.p.m. of oxygen, and the balance being titanium except for minute quantities of other elements,
    (2) cleaning the annealed titanium foil,
    (3) anodizing the cleaned titanium foil in a non-aqueous electrolyte containing a solute including a phosphorus compound comprising at least 80% $P_2O_5$ by weight to produce a dielectric oxide film thereon,
    (4) assembling the anodized titanium foil with another electrode, and
    (5) applying to the assembly of the anodized foil and the said another electrode a non-aqueous working electrolyte containing a phosphorus compound in an amount providing at least 10 grams per liter of $P_2O_5$.

5. In the process of producing an electrolytic capacitor embodying an electrode of titanium, the steps comprising:
    (1) preparing an ingot of purified titanium by electrically melting at least three times titanium metal to produce the ingot, at least two of the meltings being carried out under a high vacuum, the titanium metal after the last melting having less than 300 p.p.m. of iron, less than 130 p.p.m. of carbon and less than 750 p.p.m. of oxygen, and minute quantities of other elements,
    (2) rolling the purified titanium ingot into foil,
    (3) annealing the titanium foil at a temperature above 750° C.,
    (4) anodizing the titanium foil in a non-aqueous electrolyte containing a solute including a phosphorus compound comprising at least 80% by weight of $P_2O_5$ to produce a surface layer of a dielectric oxide,
    (5) assembling the anodized titanium foil with another electrode, and
    (6) applying to the assembly of foil and said another electrode a working electrolyte, the working electrolyte comprising a non-aqueous solvent and a phosphorus compound in an amount to provide at least 10 grams per liter of $P_2O_5$.

6. In the process of producing an electrolytic capacitor embodying an electrode of titanium, the steps comprising:
(1) anodizing in a non-aqueous electrolyte containing a solute including a phosphorus compound comprising at least 80% by weight of $P_2O_5$, a titanium electrode having an extended surface composed of highly purified titanium having less than 300 p.p.m. of iron, less than 130 p.p.m. of carbon and less than 750 p.p.m. of oxygen, the balance being titanium except for minute quantities of other elements, the anodizing producing a layer of dielectric oxide on the anodized surfaces of the titanium member,
(2) assembling the anodized titanium electrode with another electrode, and
(3) applying to the assembly of anodized titanium electrode and said another electrode a working electrolyte, the working electrolyte comprising dimethylformamide and phosphorus pentoxide in proportions to provide at least 10 grams of $P_2O_5$ per liter of electrolyte.

7. A capacitor comprising a first electrode of highly purified titanium containing less than 300 p.p.m. of iron, less than 130 p.p.m. of carbon, less than 750 p.p.m. of oxygen and the balance being titanium except for minute quantities of other elements, an anodic dielectric oxide on the surface of the titanium electrode, said dielectric oxide being the in situ product of anodizing said electrode in a non-aqueous electrolyte containing a phosphorus compound comprising at least 80% $P_2O_5$, by weight, a second electrode disposed in spaced relation to said first electrode, and a working electrolyte in contact with both the first and second electrodes.

8. A capacitor comprising a first electrode of highly purified titanium containing less than 300 p.p.m. of iron, less than 130 p.p.m. of carbon, less than 750 p.p.m. of oxygen and the balance being titanium except for minute quantities of other elements, an anodic dielectric oxide on the surface of the titanium electrode, said dielectric oxide being the in situ product of anodizing said electrode in a non-aqueous electrolyte containing a phosphorus compound comprising at least 80% $P_2O_5$, by weight, a second electrode disposed in spaced relation to said first electrode, and a working electrolyte in contact with both the first and second electrodes, the working electrolyte consisting essentially of a non-aqueous solvent and a phosphorus compound in an amount to provide at least 10 grams per liter of $P_2O_5$.

9. A capacitor comprising a first electrode of highly purified titanium containing less than 300 p.p.m. of iron, less than 130 p.p.m. of carbon, less than 750 p.p.m. of oxygen and the balance being titanium except for minute quantities of other elements, an anodic dielectric oxide on the surface of the titanium electrode, said dielectric oxide being the in situ product of anodizing said electrode in a non-aqueous electrolyte containing a phosphorus compound comprising at least 80% $P_2O_5$, by weight, a second electrode disposed in spaced relation to said first electrode, and a working electrolyte in contact with both the first and second electrodes, the working electrolyte consisting essentially of dimethylformamide and phosphorus pentoxide in proportions to provide at least 10 grams per liter of $P_2O_5$.

References Cited
UNITED STATES PATENTS

| | | | |
|---|---|---|---|
| 2,005,279 | 6/1935 | Van Geel et al. | 317—230 |
| 2,174,841 | 10/1939 | Robinson | 317—230 |
| 2,504,178 | 4/1950 | Burnham et al. | 317—230 |
| 2,934,682 | 4/1960 | Schwarz et al. | 317—230 |
| 2,994,809 | 8/1961 | Jenny et al. | 317—230 |
| 3,067,367 | 12/1962 | Ross | 317—230 |
| 3,085,052 | 4/1963 | Sibert | 317—230 |
| 3,126,503 | 3/1964 | Salomon | 317—230 |

JAMES D. KALLAM, *Primary Examiner.*